INVENTOR:
William Homfeldt,
by Carl A. Hellmann,
Attorney.

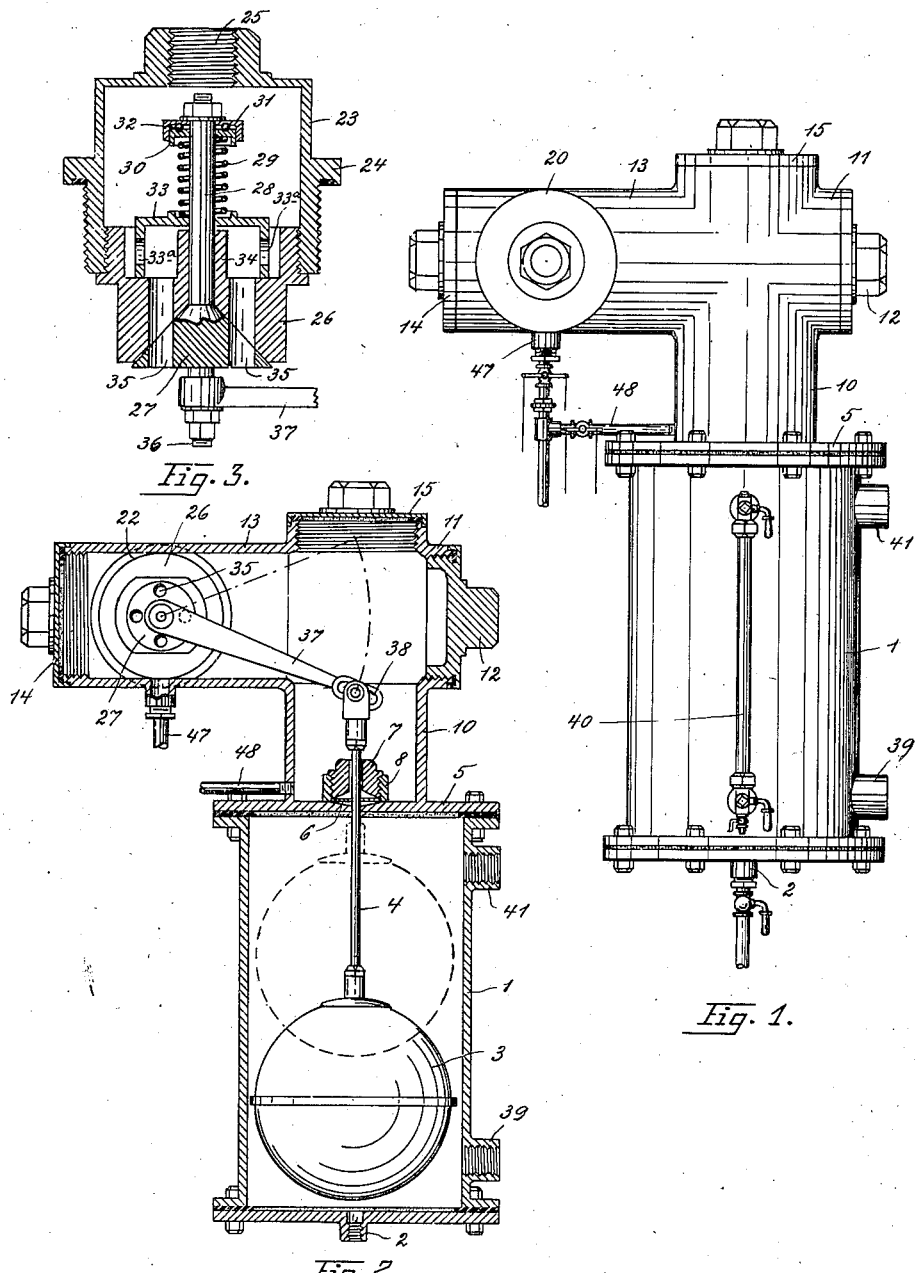

Patented Feb. 9, 1943

2,310,696

UNITED STATES PATENT OFFICE 2,310,696

AUTOMATIC WATER FEEDER FOR BOILERS

William Homfeldt, Azcapotzalco, D. F., Mexico

Application February 25, 1941, Serial No. 380,559
In Mexico May 6, 1940

4 Claims. (Cl. 137—101)

The present invention refers to improvements in automatic water feeders for boilers, in which a float actuated by the descent of the water level in the boiler, opens the steam valve for operating the feed pump in order to deliver the quantity of water necessary for keeping the water in the boiler at a constant level.

The invention has for its object several improvements in feeders of this kind, and especially means for preventing the water from ascending from the float chamber into the chamber containing the governor valve; a novel construction of this valve and its chamber, and means for discharging the water of condensation from the upper chambers and preventing its entrance into the feed pump.

In the accompanying drawings:

Figure 1 is an outer view of the automatic water feeding apparatus.

Figure 2 is a vertical cross section of the apparatus shown in Figure 1.

Figure 3 is a sectional view of the chamber containing the governor valve.

Figures 4, 5:
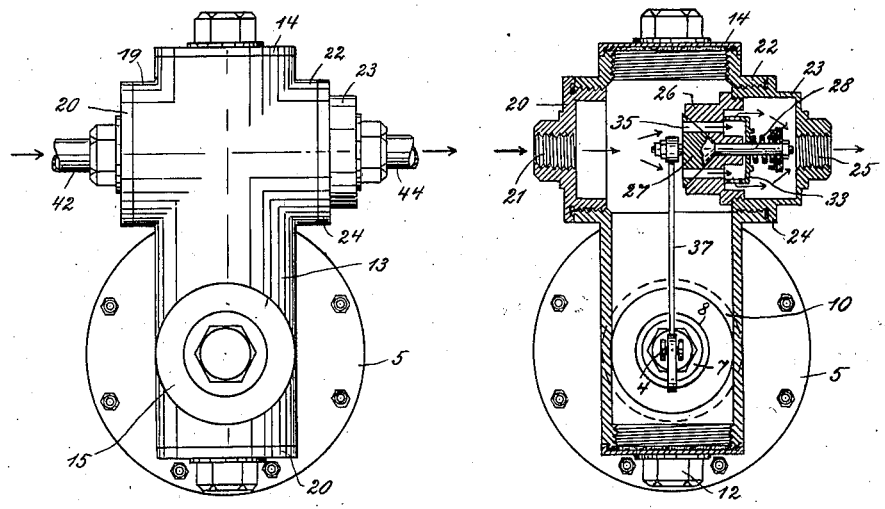
Figure 4 is a top view of the water feeding apparatus.
Figure 5 is a horizontal cross section of the upper part of the apparatus.
Figure 6:
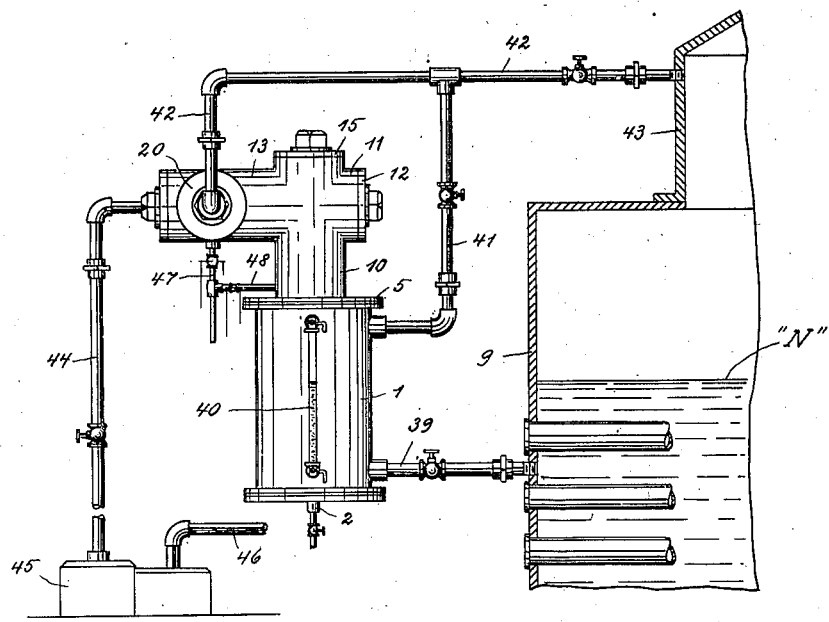
Figure 6 illustrates the connections between the feeding apparatus, the pump and the boiler.

The water feeder according to the invention comprises a cylindrical chamber 1, with discharge pipe 2 in its bottom, and enclosing a spherical float 3. The stem or rod 4 of this float passes through an aperture in the cover 5 of the cylinder 1 and through an elastic packing 6 formed by a thick membrane having its edges detained by the rim of a plug 7 screwed into a short tube 8 mounted on the cover 5. The packing 6 may rise and fall within certain limits in a space provided by concave recesses formed in the cover 5 and the plug 7 (Figure 2) and has for its object, together with the cover 5, to prevent the water passing from the boiler 9 into the float chamber 1, from ascending into the upper part of the apparatus containing the governor valve.

This upper part consists of another vertical cylinder 10 mounted on top of the chamber 1, and from which projects on one side a short tube 11 closed by a screw plug 12, and on the other side a horizontal cylindrical chamber 13, also closed by a screw plug 14. Another screw plug 15 closes the upper part of the chamber 10. The whole upper part 10—13 forms a single angular chamber.

Transversely to the chamber 13 and forming a cross with it, there is on one side a short tube 19 closed by a screw plug 20, into which enters the steam pipe from the boiler, as will be described later, and on the other side a second short tube 22 with inner thread for receiving the casing containing the governor valve.

As shown in Figures 3 and 5, this hollow casing 23 has an outer flange 24 and an outer screw thread for entering the tube 22, and its bottom is provided with a threaded perforation 25 for receiving the pipe carrying the regulated steam to the feed pump. The open side of the casing 23 is closed by a threaded plug 26 provided with a conical seat into which enters a conical valve closing member 27, the stem 28 of which is surrounded by a spring 29 which pushes said conical member 27 against its seat. This spring 29 bears against a disc 30 surrounded by the flange of another disc 31, with a ball bearing 32 between the two discs, the outer disc 31 being secured by a nut to the stem 28. The opposite end of the spring 29 rests on a cup-shaped casing 33 through which passes the stem 28 and the walls of which, provided with perforations 33ª, concentrically surround the collar 34 of the plug 26. Both the conical member 27 and its seat are provided with a number of perforations 35 disposed parallel to the axis of the cone 27, causing these perforations of the cone and seat to coincide in certain positions of the cone and not to coincide and therefore to prevent the passage of the steam in other positions of the cone.

From the base of the conical member 27 projects a short stem 36 to which is secured the end of a lever 37, the opposite end of which is attached by a longitudinal slot 38 to the upper extremity of the stem 4 of float 3.

The lower part of the chamber 1 is connected by a pipe 39 with the boiler 9, below its lowest water level. The normal level "N" in the boiler, also visible in the water gauge 40 of said chamber 1, raises the float 3 to the approximate position shown in dotted lines in Figure 2, in which position the valve 27, rotated by the lever 37 attached to the float, is closed, i. e. its perforations do not coincide with those of its seat. The upper part of chamber 1 is connected by a pipe 41 with the pipe 42 which leaves the dome 43 of the boiler and carries dry steam to the entrance 21 of the plug 20, opposite to the base of the valve 27. The water level in chamber 1 remains therefore, through the connection 41, under the same steam pressure as the water level in the boiler. The outlet 25 of the casing containing the governor valve is connected by means of the pipe 44 with the feed pump 45, from which extends also a pipe 46 conducting water to the boiler.

As the water level in the boiler descends, the float 3 also falls, operating by means of the lever 37 the valve 27 which revolves until its perforations coincide with those of its seat. The steam entering through the pipe 42 passes through these coinciding perforations, enters the space within the cup-shaped member 33, leaves this space through the holes 33ª striking against the walls of the hollow interior of the plug 26, and finally reaches through the pipe 44 the pump 45, actuating it and making it deliver the proper amount of water to the boiler. The deviation from a straight line of the steam passing through the apertures of the cup 33 has for its object to prevent a suction of the water of condensation in the angular chamber 10—13, this suction being caused by the passage of the steam to the feed pump 45. As the float rises again upon the water in the boiler reaching its normal level, the valve 27 closes and the pump stops, maintaining thereby a constant level of water in the boiler.

The governor valve 27 may be adjusted so that the pump 45 will deliver continuously to the boiler the amount of water necessary to replace the water lost by evaporation during the operation of the boiler.

Discharge pipes 47 and 48 are provided respectively in the bottoms of chambers 13 and 10 permitting the water of condensation to be discharged from these chambers.

It is understood that I do not wish to limit myself to the details of construction of the different parts described and represented in the drawings, and that changes may be made without departing from the spirit of the invention.

What I claim is:

1. An automatic water feeder for boilers, comprising a chamber adapted to be connected with a boiler below its lowest water level, a float in said chamber for rising and falling with said water level, a rod attached to said float, an upper chamber provided above said float chamber with the rod of said float extending into said upper chamber, a resilient packing around said rod for preventing the water of said float chamber from entering said upper chamber, a governor valve connected with said float and opened by the descent of said float, said governor valve being mounted in a separate detachable casing forming part of said upper chamber, and said governor valve comprising a conical closing member resting against a conical seat, both conical member and seat being provided with perforations parallel with the axis of said conical member, said perforations coinciding in the open position of the valve and not coinciding in the closed position of said valve, a spring pressing said conical member against its seat, a pipe for conducting dry steam from the boiler into said upper chamber and against the base of said conical valve closing member, means for deviating the steam from its straight course after having passed through the valve, and a pipe for conducting said steam, after its passage through said valve, to a water feed pump.

2. An automatic water feeder as defined in claim 1, having a removable cover on the upper chamber, giving access to the mechanism for adjustment while in operation.

3. An automatic water feeder as defined in claim 1, having a removable housing for the valve mechanism.

4. An automatic water feeder as defined in claim 1 having a by-pass permitting steam to enter directly into the float chamber from the boiler, without passing through the valve.

WILLIAM HOMFELDT.